(12) United States Patent
Katai (10) Patent No.: US 7,754,125 B2
(45) Date of Patent: Jul. 13, 2010

(54) SOLUTION CASTING METHOD AND APPARATUS

(75) Inventor: Yukihiro Katai, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/101,289

(22) Filed: Apr. 11, 2008

(65) Prior Publication Data

US 2008/0251967 A1 Oct. 16, 2008

(30) Foreign Application Priority Data

Apr. 11, 2007 (JP) ............................. 2007-104091

(51) Int. Cl.
*B29D 7/01* (2006.01)
(52) U.S. Cl. ...................................... 264/216; 264/444
(58) Field of Classification Search ................. 264/216, 264/444
See application file for complete search history.

(56) References Cited

U.S. PATENT DOCUMENTS 5,336,534 A * 8/1994 Nakajima et al. ........... 427/600
6,368,534 B1 4/2002 Nakamura et al.
2005/0062194 A1 * 3/2005 Kanemura ................... 264/216
2005/0161840 A1 * 7/2005 Stover et al. ................. 264/1.7

FOREIGN PATENT DOCUMENTS

JP 2001-18241 1/2001

* cited by examiner

*Primary Examiner*—Khanh Nguyen
*Assistant Examiner*—John Blades
(74) *Attorney, Agent, or Firm*—Young & Thompson (57) ABSTRACT

A camera for capturing a casting bead is provided at each side end of a discharge port in a width direction thereof. Plural speakers are provided at the vicinity of an opening of a decompression chamber. The camera continuously captures the casting bead, and outputs image data thereof to a control unit. The control unit includes a vibration detector and a suppressing vibration generator. The vibration detector detects vibration of the casting bead based on the plural image data. The suppressing vibration generator generates suppressing vibration signal representing the phase and amplitude of the suppressing vibration for suppressing the vibration generated in the thickness direction of the casting bead. The control unit controls the speakers based on the suppressing vibration signal to output sound wave. Thereby, the suppressing vibration is applied to the casting bead.

12 Claims, 6 Drawing Sheets

SOLUTION CASTING METHOD AND APPARATUS

FIELD OF THE INVENTION

The present invention relates to a solution casting method and apparatus, in which a dope is cast as a casting bead onto a support from a casting die to form a casting film, and the casting film after being solidified is peeled from the support to form a film.

BACKGROUND OF THE INVENTION

A solution casting method is widely adopted in a production of film for optical use such as liquid crystal display (LCD) film, organic electroluminescence display (organic EL display) film, polarizer film, and a film for photosensitive material. The solution casting method is as follows. A dope obtained by dissolving cellulose acetate into a solvent is cast as a casting bead onto a support, and the support is moved to form a casting film. After being solidified, the casting film is peeled from the support by a peeling roller. While being transported by use of a roller and a tenter, the peeled casting film is dried to form a film.

According to the solution casting method, when a solution is cast onto the support at a high speed, vibration occurs on the casting bead by influence of air moving in accordance with the high-speed casting (accompanied air). In view of the above, a decompression chamber is disposed at the upstream side from the casting bead in a moving direction of the support such that the pressure in an area at the upstream side is lower than that in an area at the downstream side. Thereby, the accompanied air is prevented from being applied to the casting bead directly. However, regardless of such a countermeasure, air pressure vibration in the decompression chamber, air pressure vibration by a suction duct for decompression, wind pressure vibration such as vibration of the decompression chamber to which vibration of a blower is transmitted, and vibration disturbance by machine vibration cause the casting bead to vibrate. Therefore, minute stepped thickness unevenness periodically occurs in the casting direction of the film, thus causing a problem.

To solve the above problem, there is known a solution casting method (for example, Japanese Patent Laid-Open Publication No. 2001-18241 corresponding to U.S. Pat. No. 6,368,534), in which even if vibration occurs on the casting bead when dope is cast onto the support from the casting die, it is possible to decrease thickness unevenness of the film by controlling the length of the casting bead within the range of 3 mm to 40 mm.

However, in accordance with image definition enhancement of flat panel display (FPD) in recent years, a level of quality tolerance of thickness unevenness becomes high. Therefore, it becomes impossible to achieve sufficient quality by use of the solution casting method disclosed in Japanese Patent Laid-Open Publication No. 2001-18241. Accordingly, a solution casting method and apparatus capable of producing a film while further decreasing the thickness unevenness has been desired.

SUMMARY OF THE INVENTION

In view of the above, an object of the present invention is to provide a solution casting method and apparatus capable of further decreasing thickness unevenness in a casting direction of film.

According to the present invention, there is provided a solution casting method characterized by including the steps of: discharging dope containing a polymer and a solvent as a casting bead from a casting die onto a moving support to form a casting film; solidifying the casting film on the support; peeling the solidified casting film from the support; drying the peeled casting film to form a film; and applying a suppressing vibration for suppressing vibration generated in a thickness direction of the casting bead to the casting bead.

Further, the suppressing vibration preferably has a phase opposite to that of the vibration generated in the thickness direction of the casting bead and amplitude 0.2 to 1 times larger than that of the vibration.

Furthermore, the solution casting method of the present invention preferably includes a vibration detecting process for detecting the vibration. In the vibration detecting process, the vibration is preferably identified based on change in air pressure in a decompression chamber provided in an upstream side from the casting die in a moving direction of the support. Further, the casting bead may be captured in a direction toward a side end of the casting die such that the vibration is identified based on a captured image in the vibration detecting process. Moreover, a gauge may be disposed in an upstream side or a downstream side from the casting die in the moving direction of the support such that the gauge measures distances toward plural points set on the casting bead in a width direction of the casting bead to identify the vibration based on the distance data in the vibration detecting process.

Furthermore, the solution casting method of the present invention preferably includes a sound wave generating process in which a suppressing vibration signal is generated based on the vibration detected by the vibration detecting process and sound wave is generated based on the suppressing vibration signal to apply the suppressing vibration to the casting bead. The suppressing vibration signal represents the phase and amplitude of the suppressing vibration for suppressing the vibration generated in the thickness direction of the casting bead. The sound wave is preferably generated by plural speakers disposed in a width direction of the casting bead in the sound wave generating process.

Furthermore, the solution casting method of the present invention preferably includes a vibration generating process in which a suppressing vibration signal is generated based on the vibration detected by the vibration detecting process and the suppressing vibration is applied to the casting bead by a vibration generating device provided on the casting die based on the vibration signal. The suppressing vibration signal represents the phase and amplitude of the suppressing vibration for suppressing the vibration generated in the thickness direction of the casting bead. It is preferable that a plurality of the vibration generating devices are provided in the width direction of the casting bead.

According to the present invention, there is provided a solution casting apparatus characterized by including: a moving support; a casting die for discharging dope containing a polymer and a solvent as a casting bead onto the support to form a casting film; a peeling roller for peeling the casting film solidified on the support from the support; a drying device for drying the casting film to form a film; and a vibration suppressing device for applying a suppressing vibration for suppressing a vibration in the thickness direction of the casting bead to the casting bead.

Further, the vibration suppressing device preferably includes: a decompression chamber provided in an upstream side from the casting die in a moving direction of the support; a vibration detector for detecting the vibration; and a suppressing vibration applying device for generating a suppressing vibration signal based on the vibration detected by the vibration detector and applying the suppressing vibration to the casting bead based on the vibration signal. Note that, the suppressing vibration signal represents the phase and amplitude of the suppressing vibration for suppressing the vibration generated in the thickness direction of the casting bead.

According to the present invention, in order to suppress vibration in the thickness direction of the casting bead, the suppressing vibration is applied to the casting bead, and therefore it is possible to suppress the vibration of the casting bead. Accordingly, it is possible to decrease thickness unevenness in the casting direction of the film and produce a film having a high quality.

The suppressing vibration has a phase opposite to that of the vibration generated in the thickness direction of the casting bead and amplitude 0.2 to 1 times larger than that of the vibration, and therefore it is possible to surely suppress the vibration of the casting bead. Moreover, since the vibration of the casting bead is detected and suppressing vibration corresponding to the vibration is applied to the casting bead, even if the vibration of the casting bead changes in the production of the film, it is possible to surely suppress the vibration of the casting bead by applying adequate suppressing vibration.

BRIEF DESCRIPTION OF THE DRAWINGS

One with ordinary skill in the art would easily understand the above-described objects and advantages of the present invention when the following detailed description is read with reference to the drawings attached hereto.

DESCRIPTION OF THE PREFERRED EMBODIMENTS

Embodiments of the present invention are described hereinbelow. The present invention, however, is not limited to the following embodiments.

[Film Production Line]

Figure 1:
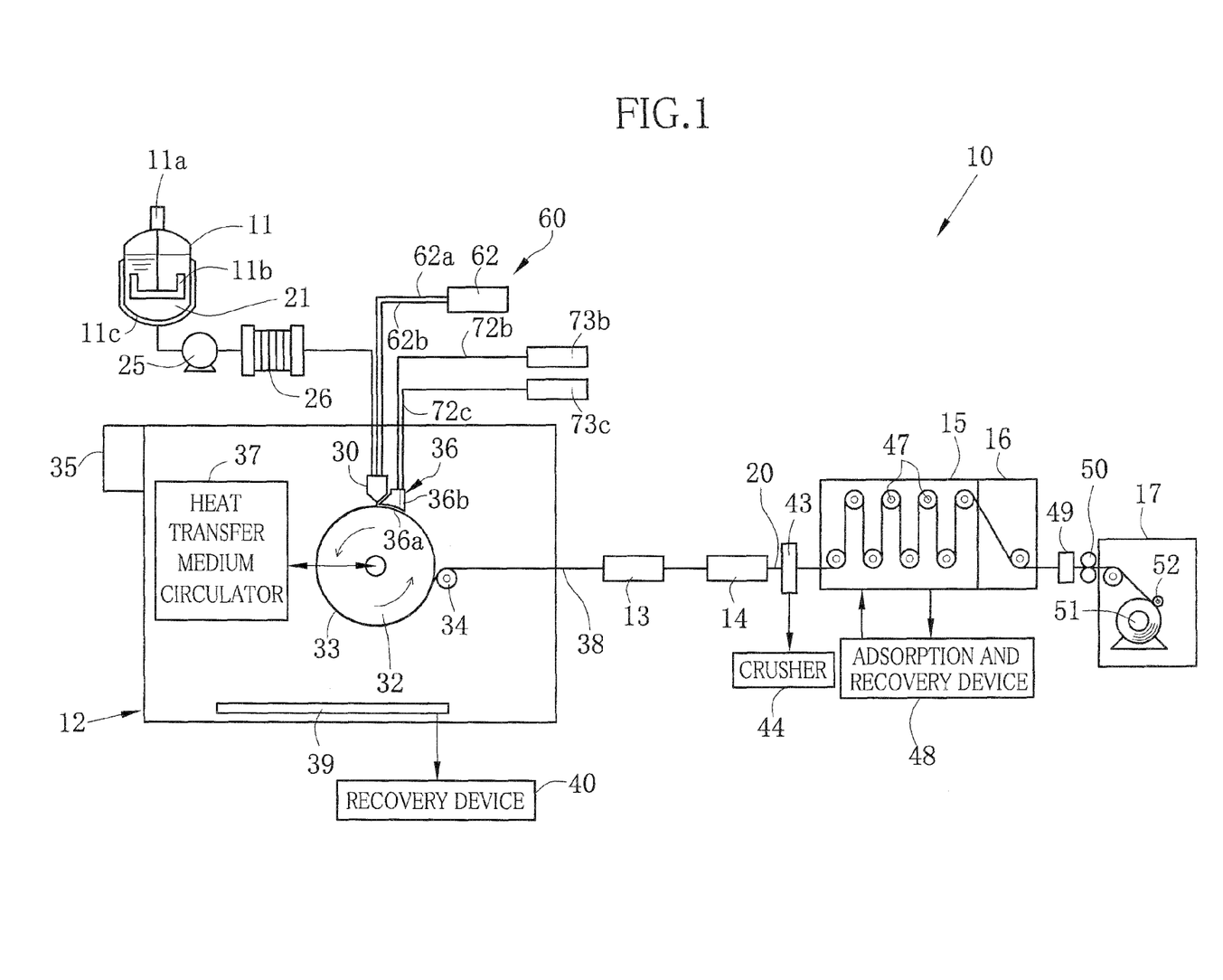
FIG. 1 is a schematic view illustrating a film production line according to an embodiment of the present invention.

As shown in FIG. 1, a film production line 10 includes a stock tank 11, a casting chamber 12, a pin tenter 13, a clip tenter 14, a drying chamber 15, a cooling chamber 16, and a winding chamber 17.

The stock tank 11 includes a motor 11a, a stirring blade 11b rotated by the motor 11a, and a jacket 11c. The stock tank 11 stores a dope 21 as a material of a film 20. A temperature of the dope 21 is adjusted so as to be approximately constant by the jacket 11c provided on the peripheral surface of the stock tank 11.

It is possible to prevent aggregation of a polymer or the like and keep the quality of the dope 21 at a constant level by rotating the stirring blade 11b. Additionally, a pump 25 and a filtration device 26 are disposed at a downstream side from the stock tank 11. The method for preparing the dope 21 is described in detail later.

The casting chamber 12 includes a casting die 30 as a port for casting the dope, a casting drum 32 as a support, a peeling roller 34 for peeling a casting film 33 from the casting drum 32, and a temperature controller 35 for controlling the temperature inside the casting chamber 12. Additionally, a decompression chamber 36 is disposed at the vicinity of the peripheral surface of the casting drum 32 between the casting die 30 and the peeling roller 34.

Figure 2:
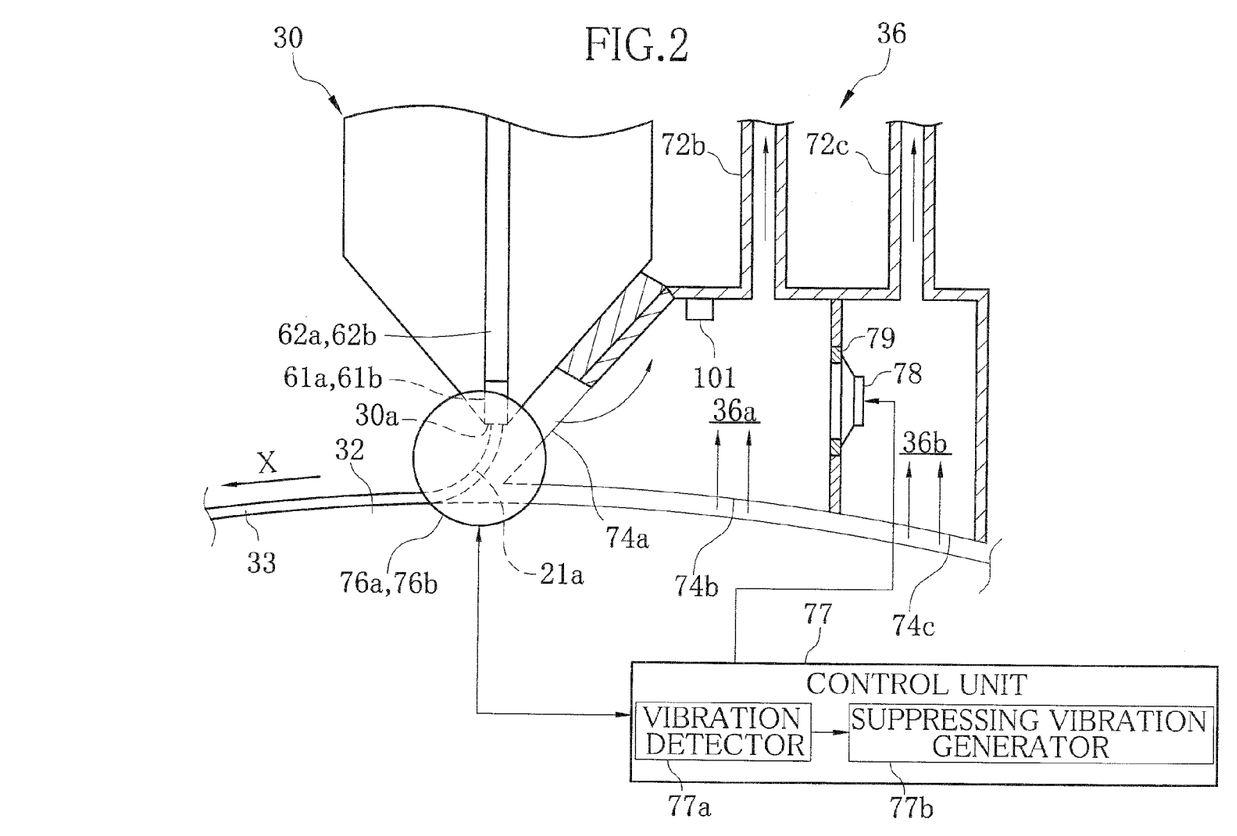
FIG. 2 is a schematic side view illustrating an inside of a casting chamber provided with a camera for detecting a vibration of a casting bead and a speaker for suppressing the vibration.

As shown in FIG. 2, the front end of the casting die 30 includes a discharge port 30a for discharging the dope 21. The dope 21 is discharged through the discharge port 30a onto the peripheral surface of the casting drum 32 located below the discharge port 30a. The material of the casting die 30 has high resistance to corrosion against electrolyte aqueous solution and a mixed liquid including dichloromethane, methanol, and the like and low thermal expansion coefficient. Further, accuracy of finishing of a contact surface between the die casting die 30 and the liquid is preferably 1 μm or less in the surface roughness, and straightness thereof is preferably 1 μm/m or less in any direction. Thereby, it is possible to form the casting film 33 having no streaks and surface irregularity on the casting drum 32 by using the casting die 30 described above.

The casting drum 32 having a cylindrical shape is rotated around the shaft of the cylinder by a driver. The driver causes the casting drum 32 to rotate in a predetermined direction at a predetermined speed (10 to 300 m/min). The peripheral surface of the casting drum 32 is subjected to chrome-plating and has sufficient resistance to corrosion and strength. Additionally, a heat transfer medium circulator 37 is attached to the casting drum 32 in order to keep the temperature of the peripheral surface of the casting drum 32 at a desired level. The heat transfer medium whose temperature is kept at a desired level by the heat transfer medium circulator 37 passes through a heat transfer passage in the casting drum 32, and then the temperature of the peripheral surface of the casting drum 32 is kept approximately constant within the range of −40° C. to 30° C.

In a casting process, the dope 21 is cast onto the peripheral surface of the casting drum 32 from the casting die 30, and the casting film 33 is formed on the peripheral surface of the casting drum 32. A casting bead 21a is formed so as to extend from the casting die 30 to the peripheral surface of the casting drum 32. The casting film 33 is transported by the rotation of the casting drum 32 in a moving direction of the casting drum 32 at a predetermined moving speed. In order to keep the shape of the casting bead 21a stable, the decompression chamber 36 decompresses an upstream side from the casting bead 21a such that the pressure in the upstream side from the casting bead 21a in the moving direction of the casting drum 32 is lower than that in the downstream side within the range of 10 Pa to 1000 Pa. After being cooled on the casting drum 32 to be solidified, the casting film 33 is peeled from the casting drum 32 by the peeling roller 34 to be a wet film 38. Note that, in the casting process, as described later, a solution for preventing solidification is supplied in order to prevent the dope 21 from being solidified (hereinafter, the method for supplying the solution is referred to as solution supplying method).

The temperature inside the casting chamber 12 is controlled by the temperature controller 35 so as to be approximately constant within a predetermined range. The casting chamber 12 includes a condenser 39 for condensing and liquidizing organic solvent vapor and a recovery device 40 for recovering the condensed and liquidized solvent. The organic solvent condensed and liquidized by the condenser 39 is recovered by the recovery device 40. The solvent is refined by a refinement device to be reused as a solvent for preparing the dope.

A pin tenter 13 and a clip tenter 14 are disposed in the downstream side from the casting chamber 12. In the pin tenter 13 the wet film 38 is dried to be a film 20. In the clip tenter 14 the film 20 is stretched while being dried. A predetermined optical property is applied to the film 20 by stretching the film 20 under a predetermined condition in the clip tenter 14. The pin tenter 13 is a drying device having plural pins as a fixing device, and the clip tenter 14 is a drying device having a clip as a holding device. Note that the clip tenter 14 may be omitted.

A slitting device 43 is disposed in the downstream side from the clip tenter 14. The slitting device 43 is provided with a crusher 44. After being cut off, both side ends of the film 20 are sent to the crusher 44 to be crushed. The pieces of film 20 thus crushed are reused as a primary dope.

The drying chamber 15 includes plural rollers 47 and an adsorption and recovery device 48. Additionally, a compulsory neutralization device (neutralization bar) 49 is disposed in the downstream side from the cooling chamber 16 next to the drying chamber 15. Moreover, a knurling roller 50 is disposed in the downstream side from the neutralization device 49 in this embodiment. A winding chamber 17 contains a winding roller 51 and a press roller 52.

As shown in FIGS. 1 and 2, a solution supplying device 60 consists of nozzles 61a and 61b, a tank 62, and pipes 62a and 62b. The nozzle 61a is disposed at one end of the discharge port 30a of the casting die 30. The nozzle 31b is disposed at another end of the discharge port 30a of the casting die 30. The tank 62 stores solution for preventing the dope 21 from being solidified. The pipes 62a and 62b connects the nozzles 61a and 61b to the tank 62, respectively. Additionally, each of the pipes 62a and 62b includes a bulb, a pump, a flow meter (flow volume meter), and the like. It is possible to supply a desired amount of solution from the tank 62 to the nozzles 61a and 61b by operating the bulb, the pump, the flow meter, and the like. Supply ports (not shown) of the nozzles 61a and 61b are approximately circular. Note that, the solution is preferably capable of dissolving the dope. As the solution there is a mixture of 86.5 parts by weight of dichloromethane, 13 parts by weight of methanol, and 0.5 parts by weight of n-butanol, for example.

The decompression chamber 36 is divided into two chambers in the rotating direction of the casting drum 32 (in the moving direction of the support, direction X shown in the drawings), and the chamber nearer the casting bead 21a is a first chamber 36a, the chamber next to the first chamber 36a is a second chamber 36b. The chambers 36a and 36b are connected to the suction devices 73b and 73c through the pipes 72b and 72c, respectively. Although the decompression chamber 36 consists of two chambers, namely the first chamber 36a and second chamber 36b, in this embodiment, the present invention is not limited thereto, and the decompression chamber 36 may consist of one chamber.

The suction devices 73b and 73c suck air in the chambers 36a and 36b through the pipes 72b and 72c respectively based on a preset decompression value. Thereby, the inner pressure of the decompression chamber 36 is decompressed to a predetermined pressure. In accordance with the decompression, the vicinity of the casting bead 21a is also decompressed to a predetermined pressure. Accordingly, the decompression chamber 36 can decompress the upstream side from the casting bead 21a in the moving direction of the casting drum 32 to a predetermined pressure. The decompression value of the suction device 73b is set so as to be lower than the decompression value of the suction device 73c. Moreover, although two suction devices 73b and 73c are disposed in this embodiment, it is also possible to use any one of the suction devices 73b and 73c. Alternatively, the pipes 72b and 72 are joined together and connected to any of the suction devices 73b and 73c.

Further, the decompression chamber 36 has an opening 74a at a position facing the casting bead 21a, and openings 74b and 74c at positions facing the casting drum 32. The end of the decompression chamber 36 in the width direction has a labyrinth-structure, thus preventing air from coming out from the end of the decompression chamber 36 in the width direction. The width of the decompression chamber 36 is wider than that of the casting bead 21a (discharge port 30a). Thereby, the decompression chamber 36 also sucks air from the outside of the end of the casting bead 21a. Additionally, in order not to damage the surface of the casting drum 32, an elastic member such as rubber is disposed at a portion having narrowest space against the casting drum 32 in the decompression chamber 36. Additionally, the decompression chamber 36 includes a barometer 101. The barometer 101 is used to adjust the decompression degree in the decompression chamber 36, and operation conditions of the suction devices 73b and 73c (for example, the rotation number of fan) are set based on pressure information from the barometer 101.

Figure 3:
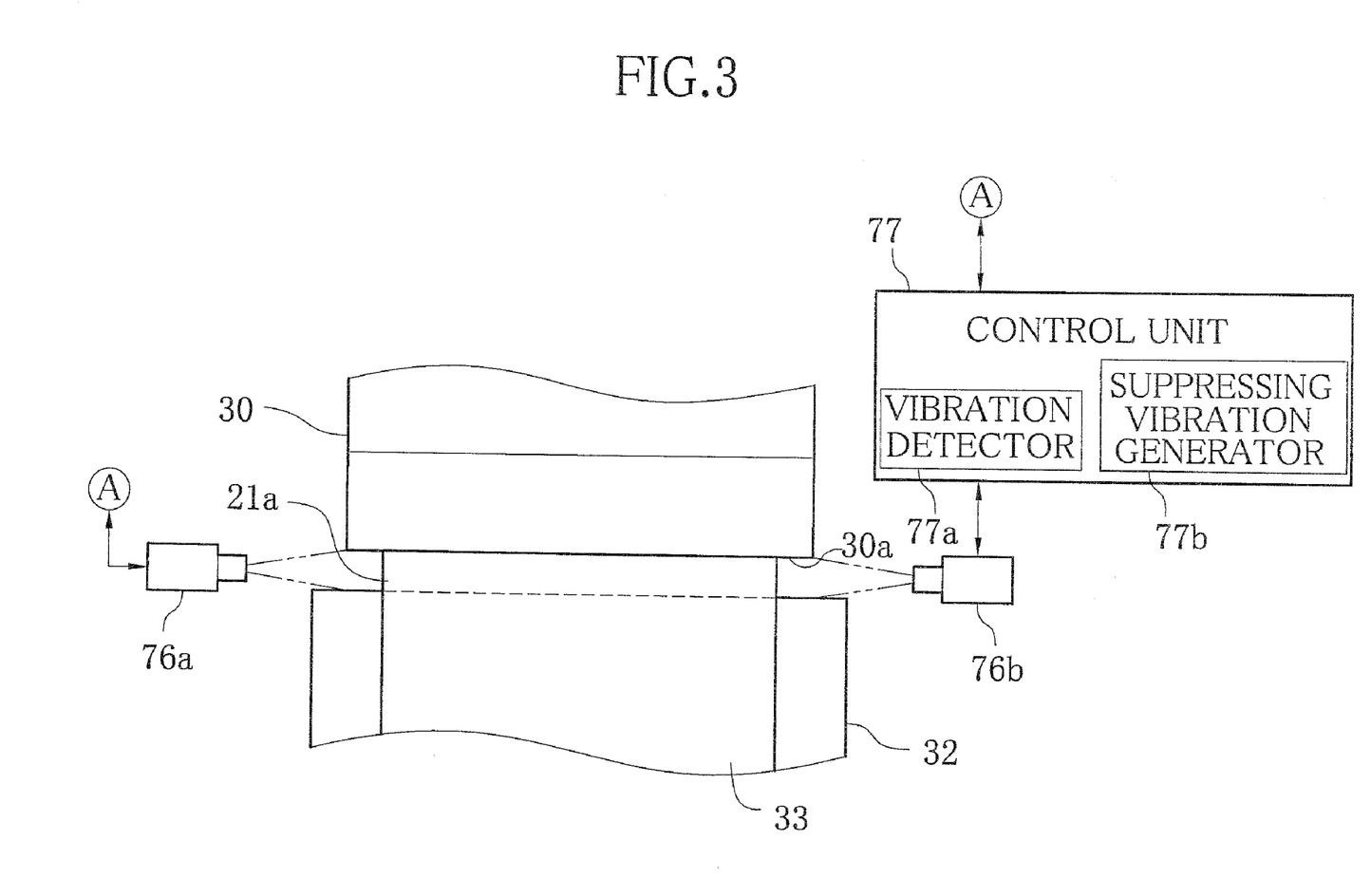
FIG. 3 is an elevation view illustrating the inside of the casting chamber provided with the camera for detecting the vibration of the casting bead.

As shown in FIG. 3, cameras 76 and 76b for capturing the casting bead 21a are respectively provided at the vicinity of the side ends of the discharge port 30a in the width direction, and connected to the control unit 77 for controlling the film production line 10 as a whole. The cameras 76a and 76b respectively capture each side of the casting bead 21a at high speed. The control unit 77 controls each of the cameras 76a and 76b to continuously capture the casting bead 21a. The cameras 76a and 76b output a large amount of image data to the control unit 77.

Moreover, the control unit 77 includes a vibration detector 77a and a suppressing vibration generator 77b. The vibration detector 77a obtains a large amount of image data captured by the camera 76a and detects vibration (frequency, amplitude, and phase) of the casting bead 21a by pattern recognition. Further, the vibration detector 77a detects the vibration of the casting bead 21a based on a large amount of image data captured by the camera 76b. The vibration detector 77a calculates an average value of the two vibrations (frequency, amplitude, and phase) of the casting bead 21a captured by the cameras 76a and 76b, and considers the calculated value as the vibration of the casting bead 21a. Note that the frequency of the vibration of the casting bead 21a is approximately 1 to 500 Hz.

Further, the suppressing vibration generator 77b generates a suppressing vibration signal whose phase is opposite to that of vibration of the casting bead 21a, whose frequency is approximately equal to that of the vibration, and whose amplitude is 0.2 to 1 times larger than that of the vibration. Note that, the suppressing vibration signal represents the phase and amplitude of the suppressing vibration for suppressing the vibration generated in the thickness direction of the casting bead. Additionally, plural speakers 78 are disposed between the first chamber 36a and the second chamber 36b toward the first chamber 36a by a mounting board 79 in the decompression chamber 36. The plural speakers 78 are disposed so as to be approximately parallel to the width direction of the casting bead 21a. Note that the amplitude of the suppressing vibration signal is more preferably 0.5 to 0.9 times larger than that of vibration of the casting bead 21a.

The control unit 77 controls the plural speakers 78 based on the suppressing vibration signal described above, and outputs sound wave whose phase is opposite to that of vibration of the casting bead 21a and whose frequency and amplitude are approximately equal to those of vibration of the casting bead 21a, to apply the suppressing vibration to the casting bead 21a. Thereby, the vibration of the casting bead 21a is canceled by the suppressing vibration to suppress the vibration of the casting bead 21a.

Although the average value of amplitudes of two vibrations calculated in accordance with the shapes of both side surfaces of the casting bead 21a is used in this embodiment, the present invention is not limited thereto, and sound wave corresponding to each of the vibrations whose phase is opposite to that of vibration of the casting bead 21a may be also outputted. In this case, the plural speakers 78 are divided into two groups in accordance with their positions in the width direction of the casting bead 21a and sound wave corresponding to each group is outputted. Alternatively, instead of dividing the speakers 78 into two groups, suppressing vibration whose phase is opposite to that of vibration at each of the plural positions of the casting bead 21a in the width direction and whose amplitude is 0.2 to 1 times larger than that may be outputted from each speaker.

Further, although the plural speakers 78 are provided to apply vibration, whose phase is opposite to that of vibration of the casting bead 21a, to the casting bead 21a as a whole in this embodiment, the present invention is not limited thereto. It is also possible to apply vibration, whose phase is opposite to that of vibration of the casting bead 21a, to a part of the casting bead 21a. For example, since vibration is likely to occur at both ends of the casting bead 21a, speakers 78 may be provided on only both ends, thus applying vibration whose phase is opposite to that of the casting bead 21a to only both ends of the casting bead 21a. Alternatively, one speaker may be provided for the decompression chamber 36, thus applying suppressing vibration to the casting bead 21a.

Although the vibration is detected based on the images obtained by capturing the side surface of the casting bead 21a, and suppressing vibration is applied to the casting bead 21a in this embodiment, the present invention is not limited thereto. It is also possible to set plural measuring points in the width direction of the casting bead 21a and detect vibration of the casting bead 21a at each measuring point to apply suppressing vibration to the casting bead 21a based on the vibration at each measuring point In this case, it is preferable that suppressing vibration is obtained at each measuring point.

Figure 4:
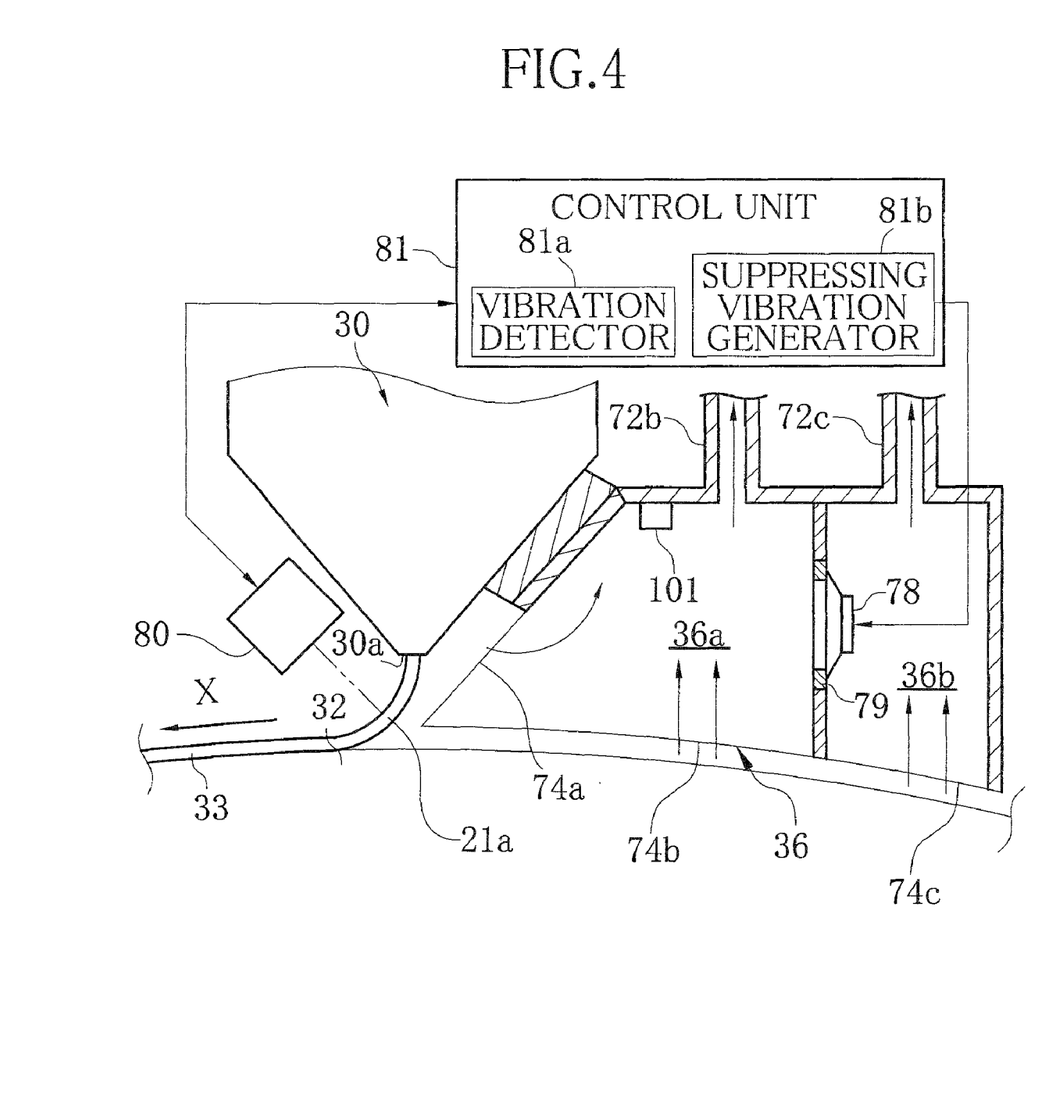
FIG. 4 is a schematic side view illustrating the inside of the casting chamber provided with a gauge for detecting the vibration of the casting bead.

By referring to FIG. 4, a case where vibrations at plural measuring points in the width direction of the casting bead 21a are detected is described. A gauge 80 is disposed in the downstream side from the casting die 30 in the moving direction of the casting drum 32. The gauge 80 has a length approximately equal to that of the discharge port 30a in the width direction, and disposed so as to be approximately parallel to the casting bead 21a and face toward the casting bead 21a.

The gauge 80 is a non-contact type gauge, and includes plural pairs of light emitting part and light receiving part. The pairs are disposed along the width direction of the casting bead 21a. The gauge 80 calculates distances toward plural points set on the casting bead 21a in a width direction of the casting bead 21a based on an angle formed between light applied from each of the light emitting parts to the casting bead 21a and the light reflected by the casting bead 21a and then received by each of the light receiving parts. Therefore, it is possible for the gauge 80 to detect the distance toward the plural measuring points set along the width direction of the casting bead 21a. Also in this case, the plural speakers 78 are provided in the decompression chamber 36 through the mounting board 79. The plural speakers 78 are disposed so as to be approximately parallel to the width direction of the casting bead 21a. The numbers and positions of the speakers 78 correspond to the light emitting part and the light receiving part described above.

The gauge 80 is connected to a control unit 81, and outputs distance information at the plural measuring points to the control unit 81. The control unit 81 includes a vibration detector 81a and a suppressing vibration generator 81b. The vibration detector 81a sequentially obtains distance information at the plural measuring points from the gauge 80, and detects the variation in thickness of the casting bead 21a at each measuring point, thus detecting vibration of the casting bead 21a at each measuring point.

Moreover, the suppressing vibration generator 81b refers to the vibration of the casting bead 21a at each measuring point and generates suppressing vibration signal whose phase is opposite to that of the vibration of the casting bead 21a at each measuring point and whose frequency and amplitude are approximately equal to those of the vibration of the casting bead 21a at each measuring point. The control unit 81 generates sound wave in accordance with the suppressing vibration signal by controlling each speaker 78, and thereby suppresses the vibration of the casting bead 21a at each measuring point in the width direction.

Although the speakers are used as the vibration suppressing device in this embodiment, the present invention is not limited thereto, and any method can be used as long as it can apply vibration whose phase is opposite to that of vibration of the casting bead 21a, whose frequency is approximately equal to that of vibration of the casting bead 21a, and whose amplitude is 0.2 to 1 times larger than that of vibration of the casting bead 21a in order to suppress the vibration of the casting bead 21a. Hereinafter, a case where piezoelectric devices are used instead of the speakers 78 is described.

Figure 5:
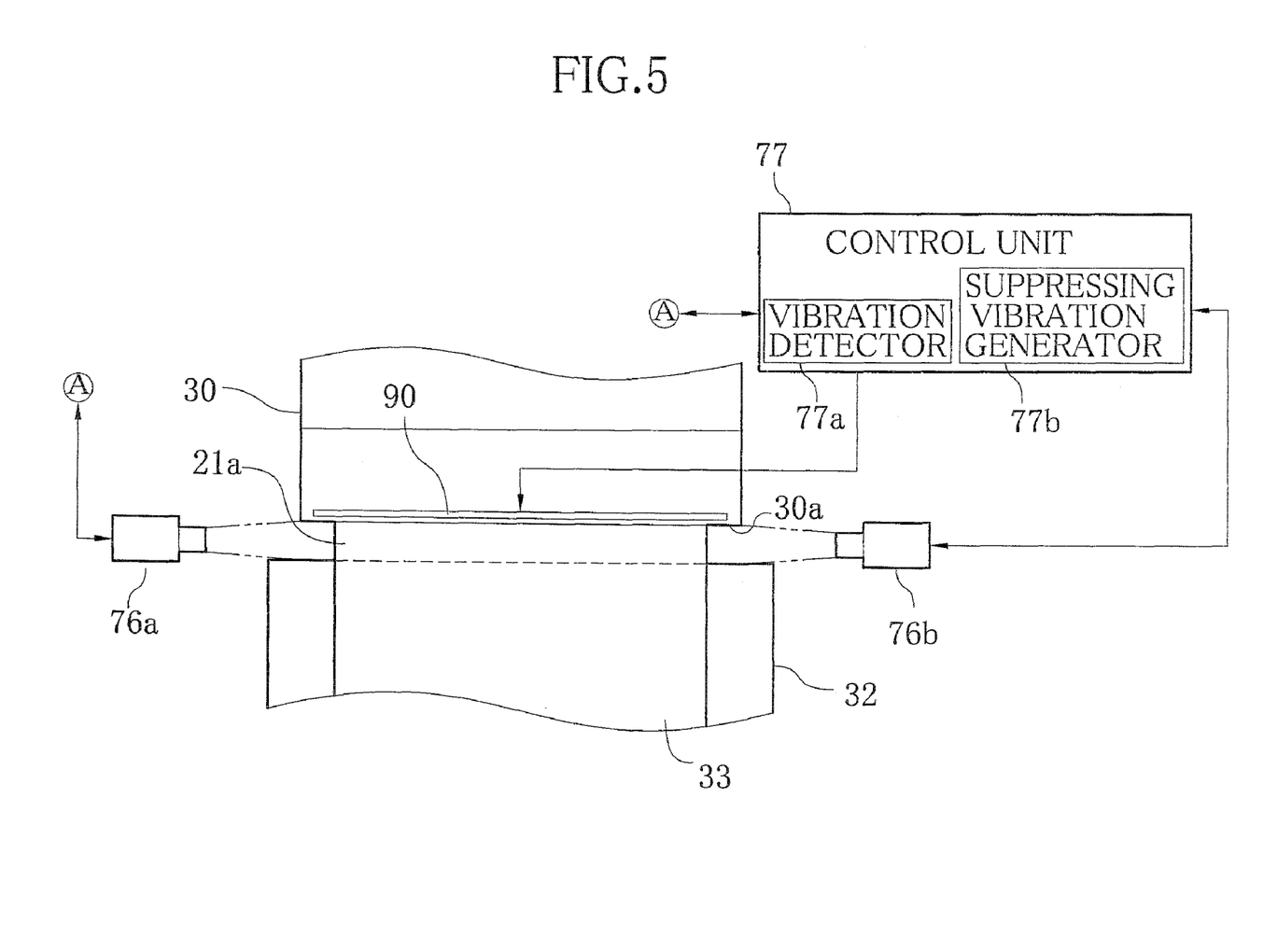
FIG. 5 is a an elevation view illustrating the inside of the casting chamber provided with a piezoelectric device part for suppressing the vibration of the casting bead.

As shown in FIG. 5, a piezoelectric device part 90 is disposed at the vicinity of the discharge port 30a in the casting die 30. The piezoelectric device part 90 includes plural piezoelectric devices aligned approximately parallel to the discharge port 30a. The piezoelectric device part 90 is connected to the control unit 77 to be controlled by the control unit 77.

After the vibration detector 77a calculates the vibration of the casting bead 21a, the control unit 77 controls the piezoelectric device part 90 and apply the suppressing vibration, whose phase is opposite to that of vibration of the casting bead 21a, whose frequency is approximately equal to that of vibration of the casting bead 21a, and whose amplitude is 0.2 to 1 times larger than that of vibration of the casting bead 21a, to the casting bead 21a. Thereby, the vibration of the casting bead 21a is canceled, thus suppressing the vibration of the casting bead 21a. Note that, also in this case, instead of the cameras 76a and 76b, the gauge 80 may be disposed in order to detect the vibration of the casting bead 21a.

Although the vibration of the casting bead 21a is detected based on the image and change in position of the surface thereof in this embodiment, the present invention is not limited thereto. The vibration of the casting bead 21a may be identified by other methods. For example, since it is known that the air pressure in the upstream side from the casting bead 21a changes in accordance with the vibration of the casting bead 21a and the change in the air pressure is transmitted to the decompression chamber 36 to cause the change in air pressure in the decompression chamber 36, it is possible to identify the vibration of the casting bead 21a based on the change in air pressure in the decompression chamber 36. Hereinafter, a case where the vibration of the casting bead 21a is detected based on the change in air pressure in the decompression chamber 36.

Figure 6:
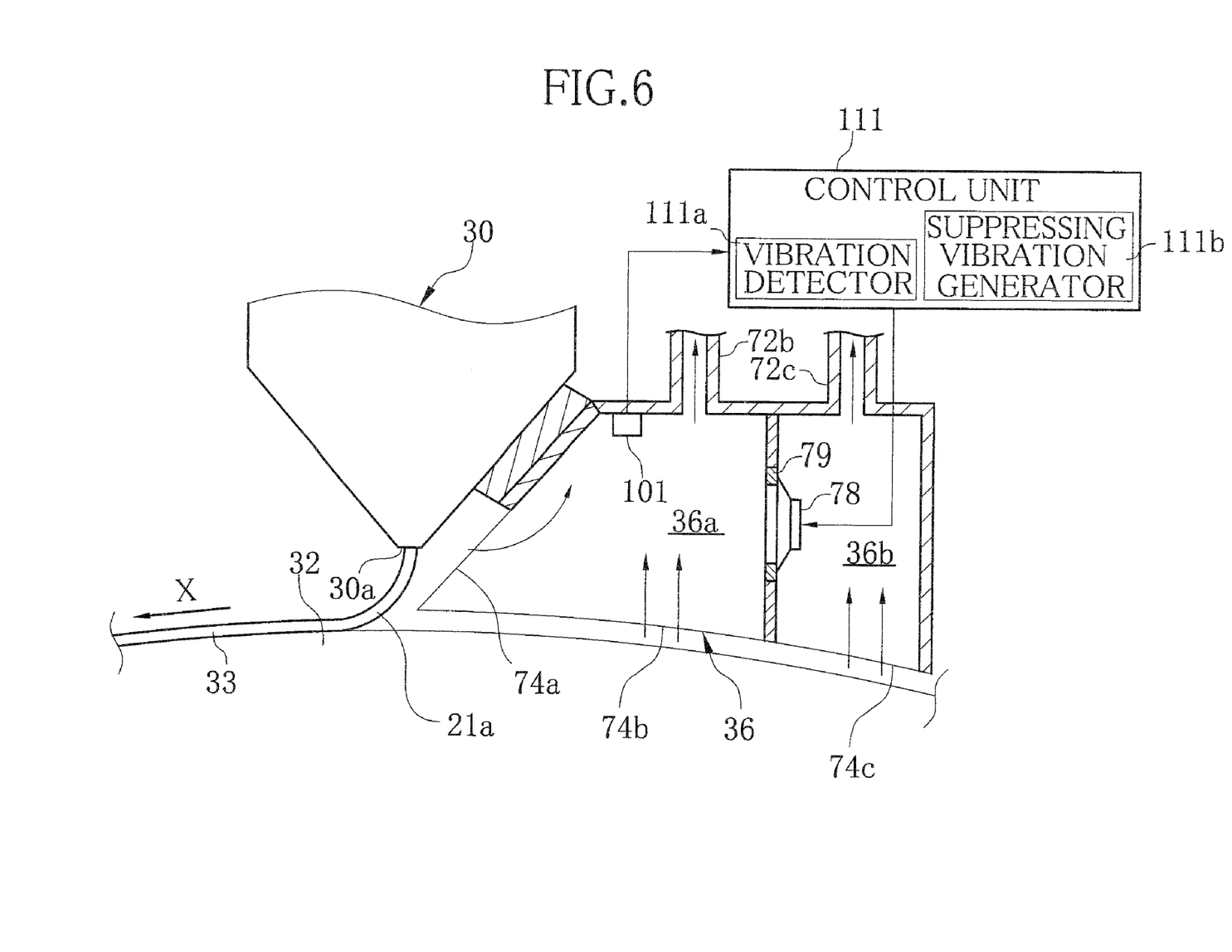
FIG. 6 is a schematic side view illustrating the inside of the casting chamber having a barometer for detecting the vibration of the casting bead disposed in a decompression chamber.

As shown in FIG. 6, the barometer 101 and the speakers 78 are connected to the control unit 111. The speakers 78 are disposed at plural points along the width direction of the decompression chamber 36 as in the case described above.

The barometer 101 detects the air pressure in the decompression chamber 36, and sequentially outputs the air pressure information to the control unit 111. The control unit 111 includes a vibration detector 111a and a suppressing vibration generator 111b. The vibration detector 111a sequentially obtains the air pressure information outputted from the barometer 101, and detects the change in air pressure (frequency, amplitude, and phase) in the decompression chamber 36.

The vibration detector 111a includes a built-in memory. The built-in memory stores a table representing the vibration of the casting bead 21a corresponding to the change in air pressure. After detecting the change in air pressure in the decompression chamber 36, the vibration detector 111a refers to the table, and identifies the vibration of the casting bead 21a corresponding to the change in air pressure.

The suppressing vibration generator 111b generates the suppressing vibration signal whose phase is opposite to that of vibration of the casting bead 21a, whose frequency is approximately equal to that of vibration of the casting bead 21a, and whose amplitude is 0.2 to 1 times larger than that of vibration of the casting bead 21a. The control unit 111 controls the plural speakers 78 based on the suppressing vibration signal, and applies the suppressing vibration to the casting bead 21a. Thereby, the vibration of the casting bead 21a can be suppressed. Note that, in this case, other than the speakers 78, for example, the piezoelectric device part 90 described above can be used to apply the suppressing vibration to the casting bead 21a.

Next, by referring to FIG. 1, an example of method for producing the film 20 by the film production line 10 is described. In the stock tank 11, the heat transfer medium is supplied to the inside of the jacket 11c to adjust the temperature of the dope 21 within the range of 25° C. to 39° C., and further the quality of the dope 21 is always kept at a constant level by rotating the stirring blade 11b. An adequate amount of the dope 21 is supplied from the stock tank 11 by the pump 25 to the filtration device 26 to be filtered therein. As a result, impurities are removed from the dope 21.

The casting drum 32 is caused to move by the driver at a predetermined speed (10 to 150 m/min). The heat transfer medium circulator 37 adjusts the surface temperature of the casting drum 32 at an approximately constant level within the range of −40° C. to 30° C. The dope 21 whose temperature is kept within the range of 30° C. to 39° C. is cast onto the peripheral surface of the casting drum 32 from the casting die 30. The dope 21 becomes the casting film 33 on the peripheral surface of the casting drum 32. Thereafter, the casting film 33 can be cooled and solidified (turn into a gel-state) on the peripheral surface of the casting drum 32. As the cooling of the casting film 33 proceeds, cross-linking point as the base of the crystal is formed to promote the gelation of the casting film 33. As the gelation proceeds, the casting film 33 is solidified, and thereafter the casting film 33 is peeled from the casting drum 32 by the peeling roller 34 to form the wet film 38. The wet film 38 is sent to the pin tenter 13.

In the pin tenter 13, plural pins are inserted into the both side ends of the wet film 38 and fixed thereto. While being transported in the pin tenter 13, the wet film 38 is dried to form the film 20. The film 20 still containing the solvent is sent to the clip tenter 14.

In the clip tenter 14, both side ends of the film 20 are held by the plural clips moving endlessly in accordance with the moving chain. Thereafter, while being transported in the clip tenter 14, the film 20 is dried. At this time, the width of the clips opposed to each other is increased to apply tension to the width direction of the film 20, thus stretching the film 20. As described above, since the film 20 is stretched in the width direction, molecules in the film 20 are orientated, and thereby a desired retardation value can be applied to the film 20.

The slitting device 43 slits the both side ends of the film 20 sent from the clip tenter 14. The film 20 whose side ends are cut away passes through the drying chamber 15 and the cooling chamber 16, and is wound by the winding roller 51 provided in the winding chamber 17. Note that the both side ends of the film 20 cut off by the slitting device 43 are crushed by the crusher 44 and reused as chips for preparing the dope.

As shown in FIG. 2, the dope 21 is cast as the casting bead 21a onto the casting drum 32 from the discharge port 30a of the casting die 30. At this time, the decompression chamber 36 decompresses the upstream side from the casting bead 21a in the moving direction of the casting drum 32 such that the pressure in the upstream side from the casting bead 21a is lower than that in the downstream side by predetermined pressure. Thereby, it is possible to keep adhesion between the casting film 33 and the peripheral surface of the casting drum 32 in the high-speed casting.

Further, the both side surfaces of the casting bead 21a are captured by the cameras 76a and 76b, and the image data obtained by the capturing is sequentially sent to the control unit 77. The vibration detector 77a calculates the vibration (frequency, amplitude, and phase) of the casting bead 21a based on the image data.

The control unit 77 controls the speakers 78, and applies change in wind pressure as the vibration, whose phase is opposite to that of the vibration of the casting bead 21a, to the casting bead 21a. Thereby, it is possible to suppress the vibration of the casting bead 21a even in the high-speed casting and prevent minute stepped thickness unevenness which occurs periodically in the longitudinal direction of the film 20 (casting direction).

Hereinafter, the materials used for preparing the dope 21 in the present invention are described.

In this embodiment, cellulose acylate is used as a polymer. As the cellulose acylate, triacetyl cellulose (TAC) is especially preferably used. In cellulose acylate describe above, it is preferable that the degree of the acyl substitution for hydrogen atoms in hydroxyl groups in cellulose satisfies all of the following formulae:

$$2.5 \leq A+B \leq 3.0 \quad \text{(a)}$$

$$0 \leq A \leq 3.0 \quad \text{(b)}$$

$$0 \leq B \leq 2.9 \quad \text{(c)}$$

In the above formulae (a) to (c), the A represents a degree of substitution of the hydrogen atom in the hydroxyl group to the acetyl group in cellulose, while the B represents a degree of substitution of the hydrogen atom in the hydroxyl group to the acyl group with 3 to 22 carbon atoms in cellulose. Note that 90 mass % or more of the TAC is preferably particles having a diameter within the range of 0.1 to 4 mm. However, the polymer applicable to the present invention is not limited to cellulose acylate, and the polymer containing cellulose acetate, propionate, cellulose acetate butyrate, and the like can be used to obtain the same effect.

Cellulose has glucose units making β-1,4 bond, and each glucose unit has a liberated hydroxyl group at second, third, and sixth positions. Cellulose acylate is a polymer in which a part of or the whole of the hydroxyl groups are esterified so that the hydrogen is substituted by the acyl group with two or more carbons. The degree of substitution for the acyl groups in cellulose acylate means a degree of esterification of the hydroxyl group at each of the second, the third, and the sixth positions in cellulose. Note that when the whole (100%) of the hydroxyl group at the same position is substituted, the degree of substitution at this position is 1.

The total degree of substitution for the acyl groups, namely DS2+DS3+DS6, is preferably in the range of 2.00 to 3.00, more preferably in the range of 2.22 to 2.90, and most preferably in the range of 2.40 to 2.88. In addition, DS6/(DS2+DS3+DS6) is preferably at least 0.28, more preferably at least 0.30, and most preferably in the range of 0.31 to 0.34. Note that DS2 is the degree of substitution of the hydrogen atom in the hydroxyl group at second position per glucose unit to the acyl group, DS3 is the degree of substitution of the hydrogen atom in the hydroxyl group at third position per glucose unit to the acyl group, and DS6 is the degree of substitution of the hydrogen atom in the hydroxyl group at sixth position per glucose unit to the acyl group.

In the present invention, the kind of the acyl groups in cellulose acylate can be one or more. When two or more kinds of acyl groups are in cellulose acylate, it is preferable that one of them is the acetyl group. When a total degree of substitution of the hydroxyl group at the second, the third, and the sixth positions to the acetyl groups and that to acyl groups other than acetyl groups are described as DSA and DSB, respectively, the value of DSA+DSB is preferably in the range of 2.22 to 2.90, and more preferably in the range of 2.40 to 2.88.

In addition, DSB is preferably at least 0.30, and more preferably at least 0.7. In the DSB, the percentage of the substitution of the hydroxyl group at the sixth position is preferably at least 20%. The percentage is more preferably at least 25%, further more preferably at least 30%, and most preferably at least 33%. Furthermore, the value of DSA+DSB, in which the hydroxyl group is at the sixth position in cellulose acylate, is preferably at least 0.75, more preferably at least 0.80, and most preferably at least 0.85. By using the cellulose acylate that satisfies the above conditions, dope with very excellent solubility can be prepared. Note that in a case where the cellulose acylate described above is used, since using a non-chlorine organic solvent represents excellent solubility, it is possible to produce the dope with low viscosity and excellent filterability.

According to the present invention, as for cellulose acylate, the acyl group having at least 2 carbon atoms may be either aliphatic group or aryl group, and is not especially limited. As examples of the cellulose acylate, there are alkylcarbonyl ester, alkenylcarbonyl ester, aromatic carbonyl ester, aromatic alkylcalbonyl ester, and the like. Cellulose acylate maybe also esters having other substituents. Preferable substituents are, for example, propionyl group, butanoyl group, pentanoyl group, hexanoyl group, octanoyl group, decanoyl group, dodecanoyl group, tridecanoyl group, tetradecanoyl group, hexadecanoyl group, octadecanoyl group, iso-butanoyl group, t-butanoyl group, cyclohexane carbonyl group, oleoyl group, benzoyl group, naphtylcarbonyl group, cinnamoyl group, and the like. Among them, more preferable groups are propionyl group, butanoyl group, dodecanoyl group, octadecanoyl group, t-butanoyl group, oleoyl group, benzoyl group, naphtyl carbonyl group, cinnamoyl group, and the like. Particularly, propionyl group and butanoyl group are most preferable.

According to the present invention, as the solvent to be used for preparing the dope, there are aromatic hydrocarbon (for example, benzene, toluene, and the like), halogenated hydrocarbon (for example, dichloromethane, chlorobenzene, and the like), alcohol (for example, methanol, ethanol, n-propanol, n-butanol, diethylene glycol, and the like), ketone (for example, acetone, methylethyl ketone, and the like), ester (for example, methylacetate, ethylacetate, propylacetate, and the like), ether (for example, tetrahydrofuran, methylcellosolve, and the like), and the like. Note that according to the present invention, the dope means a polymer solution or dispersion liquid obtained by dissolving or dispersing polymer in the solvent).

Preferably, the halogenated hydrocarbon has 1 to 7 carbon atoms. Most preferably used is dichloromethane. In view of physical properties, such as solubility of the TAC, peelability of the casting film from the support, a mechanical strength of the film, and optical properties, it is preferable to use at least one kind of alcohol having 1 to 5 carbon atoms together with dichloromethane. The content of alcohol is preferably in the range of 2 mass % to 25 mass %, and more preferably in the range of 5 mass % to 20 mass % relative to the whole solvent. Applicable alcohols are, for example, methanol, ethanol, n-propanol, iso-propanol, n-butanol, and the like, and especially methanol, ethanol, n-butanol, and a mixture of them are more preferable among them.

Recently, in order to suppress adverse influence on the environment to minimum extent, a solvent containing no dichloromethane is proposed. In this case, the solvent preferably contains ether with 4 to 12 carbon atoms, ketone with 3 to 12 carbon atoms, ester with 3 to 12 carbon atoms, alcohol with 1 to 12 carbon atoms, or an appropriate mixture of them. For example, there is a mixture of methyl acetate, acetone, ethanol, and n-butanol. Note that ether, ketone, esther, and alcohol may have a cyclic structure, and a compound having at least two functional groups thereof (that is, —O—, —CO—, —COO—, and —OH) may be used as the solvent.

The details about cellulose acylate are described in paragraphs [0140] to [0195] in Japanese Patent Laid-Open Publication No. 2005-104148. The description is also applicable to the present invention. Further, the solvent, various additives such as a plasticizer, a deterioration inhibitor, a UV-absorbing agent, an optical anisotropy controller, a retardation controller, dye, matting agent, a release agent, and a release promoting agent are described in detail in paragraphs [0196] to [0516] in Japanese Patent Laid-Open Publication No. 2005-104148. The description is also applicable to the present invention.

The casting die, the decompression chamber, a structure of the support or the like, co-casting, the peeling method, stretching, the drying condition in each process, the handling method, curling, the winding method after correcting smoothness, the solvent recovering method, and the film recovering method are described in detail in paragraphs [0617] to [0889] in Japanese Patent Laid-Open Publication No. 2005-104148. The description is also applicable to the present invention.

According to the solution casting method of the present invention, in casting the dope, co-casting by simultaneous stacking and co-casting by sequential stacking can be selectively used. In the co-casting by simultaneous stacking, two or more kinds of dopes are subjected to co-casting simultaneously to be stacked. In the co-casting by sequential stacking, plural kinds of dopes are subjected to co-casting sequentially to be stacked. Note that both of them may be combined to be used. In the co-casting by simultaneous stacking, a casting die provided with a feed block may be used, or multi-manifold-type casting die may be used. Note that, in a multilayer film obtained by the co-casting, any one of thickness of the layer at the side exposed to air and the thickness of the layer at the side of the support is preferably 0.5% to 30% relative to the total thickness of the film. Further, in the co-casting by simultaneous stacking, when the dope is cast onto the support from a die slit (discharge port), the dope with high viscosity is preferably surrounded by the dope with low viscosity. In the casting bead formed so as to extend from the die slit to the support, the dope exposed outside preferably has a relative proportion of alcohol higher than that of the dope located inside.

Note that, although the vibration is calculated based on the image of the casting bead or the vibration is detected based on change in position of the surface of the casting bead in the above embodiment, the present invention is not limited thereto. In order to detect the vibration of the casting bead, any other method can be used as long as it can detect the vibration of the casting bead.

Note that, although the suppressing vibration is applied to the casting bead by the speakers or piezoelectric devices in the above embodiment, the present invention is not limited thereto. Any device can be used as long as it can apply suppressing vibration to the casting bead.

Further, although the vibration of the casting bead is detected in the above embodiment, the present invention is not limited thereto. It is also possible to detect stepped thickness unevenness which occurs periodically in the bead casting direction, and apply the suppressing vibration so as to cancel the thickness unevenness. In this case, the relation between the stepped thickness unevenness in the bead casting direction and frequency, phase, and amplitude of the vibration to be applied to the casting bead is preliminarily obtained, and then the vibration for canceling the stepped thickness unevenness is applied to the casting bead. The thickness unevenness is identified by detecting the position of the casting film at the surface side and the position thereof at the support side just after casting, obtaining thickness based on these positions, and referring the change in thickness in the casting direction. Alternatively, the thickness unevenness may be identified based on the change in film thickness in the process posterior to the casting process. However, as the distance between the position at which thickness unevenness is identified and the casting die becomes longer, the thickness unevenness occurs due to other factors. Therefore, the variation thickness is preferably obtained just after the casting die.

Additionally, although the decompression chamber is provided in the above embodiment, instead of or in addition to the decompression chamber, a wind shielding member such as wind shielding plate and wind shielding block may be provided in the upstream side or downstream side from the casting bead in the casting direction, or provided in both side ends of the casting bead. Additionally, partition plates and other members of a back chamber (decompression chamber), which are close to the support, are preferably elastic members such as rubber so as not to damage the support.

Further, although the casting drum is used as the support in the above embodiment, the present invention is not limited thereto. A casting band may be used instead of the casting drum.

EXAMPLE 1

The decompression chamber 36 shown in FIG. 6 was provided in the film production line 10. Based on the air pressure information from the barometer 101, the suppressing vibration was applied to the casting bead 21a. A film was formed under the following conditions. The distance "h" between the casting die 30 and the casting drum 32 was 3.5 mm, the decompression degree "p" of the decompression chamber 36 was −40 Pa, the viscosity "μ" of the dope was 45 Pa·s, a die lip clearance "c1" was 0.9 mm, the casting speed "v" was 50 m/min, and the thickness "t" of the base was 80 μm. At this time, it was detected that when a ribbon length (length of the casting bead) "L" thereof was 19 mm, the static pressure fluctuation range (amplitude) ΔP of the decompression chamber 36 was 2.4 Pa. The suppressing vibration having the amplitude ΔP of 1.5 Pa, whose phase was opposite to that of the vibration of the casting bead, was applied to the casting bead, and as a result, the thickness unevenness which periodically occurs in the longitudinal direction of the film (casting direction) was less than 0.1% and therefore the thickness unevenness was not detected, and further there was observed no stepped thickness unevenness with eyes. Note that a percentage "d" of the thickness unevenness is represented by average value 1/average value 2. The average value 1 is obtained by subtracting the value of the lowest convex of unevenness on the surface of the film from the value of the highest convex thereof. The average value 2 is average thickness of the film. The percentage "d" of the thickness unevenness means degree of unevenness. The decision to pass or fail was based on a relational expression between the pitch and thickness unevenness described in Japanese Patent Laid-Open Publication No. 2002-103358. When the relational expression was satisfied, the thickness unevenness was evaluated as passing. When the relational expression was not satisfied, the thickness unevenness was evaluated as failing.

COMPARATIVE EXAMPLE 1

The decompression chamber 36 shown in FIG. 6 was provided in the film production line 10. The film was formed under the same condition as described above except that no suppressing vibration was applied to the casting bead 21a. At this time, the pitch "a" of the thickness unevenness was 2.4 cm, and the percentage "d" of the thickness unevenness was 5.3%. Thus, the thickness unevenness was evaluated as failing.

COMPARATIVE EXAMPLE 2

Under the same conditions as those in Example 1 except that the suppressing vibration having the amplitude ΔP of 2.5 Pa, whose phase was opposite to that of the vibration of the casting bead, was applied to the casting bead, the film was formed. As a result, the pitch "a" of the thickness unevenness was 2.4 cm, and the percentage "d" of the thickness unevenness was 2.0%. Although the occurrence of the thickness unevenness can be suppressed more in comparison with Comparative Example 1 in which no suppressing vibration having the phase opposite to that of the vibration of the casting bead was applied to the casting bead, the evaluation about the thickness unevenness was considered as failing.

COMPARATIVE EXAMPLE 3

Under the same conditions as those in Example 1, except that the suppressing vibration having the amplitude ΔP of 0.5 Pa, whose phase was opposite to that of the vibration of the casting bead, was applied to the casting bead, the film was formed. As a result, the pitch "a" of the thickness unevenness was 2.4 cm, and the percentage "d" of the thickness unevenness was 3.0%. Although the occurrence of the thickness unevenness can be suppressed more in comparison with Comparative Example 1 in which no suppressing vibration having the phase opposite to that of the vibration of the casting bead was applied to the casting bead, the evaluation about the thickness unevenness was considered as failing.

In view of the above result, it is confirmed that, in a case where a film is formed while applying suppressing vibration to the casting bead, it is possible to suppress periodical occurrence of the stepped thickness unevenness more in comparison with the case where no suppressing vibration is applied to the casting bead.

The present invention is not to be limited to the above embodiments, and on the contrary, various modifications will be possible without departing from the scope and spirit of the present invention as specified in claims appended hereto.

What is claimed is:

1. A solution casting method comprising the steps of:
    discharging dope containing a polymer and a solvent as a casting bead from a casting die onto a moving support to form a casting film;
    solidifying said casting film on said support;
    peeling said solidified casting film from said support;
    drying said peeled casting film to form a film;
    applying to said casting bead a suppressing vibration for suppressing vibration generated in a thickness direction of said casting bead;
    a vibration detecting process for detecting said vibration;
    a sound wave generating process in which a suppressing vibration signal is generated based on said vibration detected by said vibration detecting process and sound wave is generated based on said suppressing vibration signal to apply said suppressing vibration to said casting bead, said suppressing vibration signal representing the phase and amplitude of said suppressing vibration for suppressing said vibration generated in the thickness direction of said casting bead; and
    a vibration generating process in which said suppressing vibration signal is generated based on said vibration detected by said vibration detecting process and said suppressing vibration is applied to said casting bead by a vibration generating device provided on said casting die based on said vibration signal, said suppressing vibration signal representing the phase and amplitude of said suppressing vibration for suppressing said vibration generated in the thickness direction of said casting bead.

2. A solution casting method as defined in claim 1, wherein said suppressing vibration has a phase opposite to that of the vibration generated in a thickness direction of said casting bead and amplitude 0.2 to 1 times larger than that of the vibration.

3. A solution casting method as defined in claim 1, wherein said vibration is identified based on change in air pressure in a decompression chamber provided in an upstream side from said casting die in a moving direction of said support in said vibration detecting process.

4. A solution casting method as defined in claim 1, wherein said casting bead is captured in a direction toward a side end of said casting die, and said vibration is identified based on a captured image in said vibration detecting process.

5. A solution casting method as defined in claim 1, wherein a gauge is disposed in an upstream side or a downstream side from said casting die in the moving direction of said support, and said gauge measures distances toward plural points set on said casting bead in a width direction of said casting bead, to identify said vibration based on said distance data in said vibration detecting process.

6. A solution casting method as defined in claim 1, wherein a plurality of said vibration generating devices are provided in the width direction of said casting bead.

7. A solution casting method comprising the steps of:
    discharging dope containing a polymer and a solvent as a casting bead from a casting die onto a moving support to form a casting film;
    solidifying said casting film on said support;
    peeling said solidified casting film from said support;
    drying said peeled casting film to form a film;
    applying to said casting bead a suppressing vibration for suppressing vibration generated in a thickness direction of said casting bead;
    a vibration detecting process for detecting said vibration; and
    a vibration generating process in which said suppressing vibration signal is generated based on said vibration detected by said vibration detecting process and said suppressing vibration is applied to said casting bead by a vibration generating device provided on said casting die based on said vibration signal, said suppressing vibration signal representing the phase and amplitude of said suppressing vibration for suppressing said vibration generated in the thickness direction of said casting bead.

8. A solution casting method as defined in claim 1, wherein said suppressing vibration has a phase opposite to that of the vibration generated in a thickness direction of said casting bead and amplitude 0.2 to 1 times larger than that of the vibration.

9. A solution casting method as defined in claim 7, wherein said vibration is identified based on change in air pressure in a decompression chamber provided in an upstream side from said casting die in a moving direction of said support in said vibration detecting process.

10. A solution casting method as defined in claim 7, wherein said casting bead is captured in a direction toward a side end of said casting die, and said vibration is identified based on a captured image in said vibration detecting process.

11. A solution casting method as defined in claim 7, wherein a gauge is disposed in an upstream side or a downstream side from said casting die in the moving direction of said support, and said gauge measures distances toward plural points set on said casting bead in a width direction of said casting bead, to identify said vibration based on said distance data in said vibration detecting process.

12. A solution casting method as defined in claim 7, wherein a plurality of said vibration generating devices are provided in the width direction of said casting bead.

* * * * *